Jan. 24, 1956
B. N. TORELL
2,731,794
EXHAUST GAS TEMPERATURE RESPONSIVE FUEL
SYSTEM FOR GAS TURBINE POWER PLANT
Filed Feb. 27, 1952
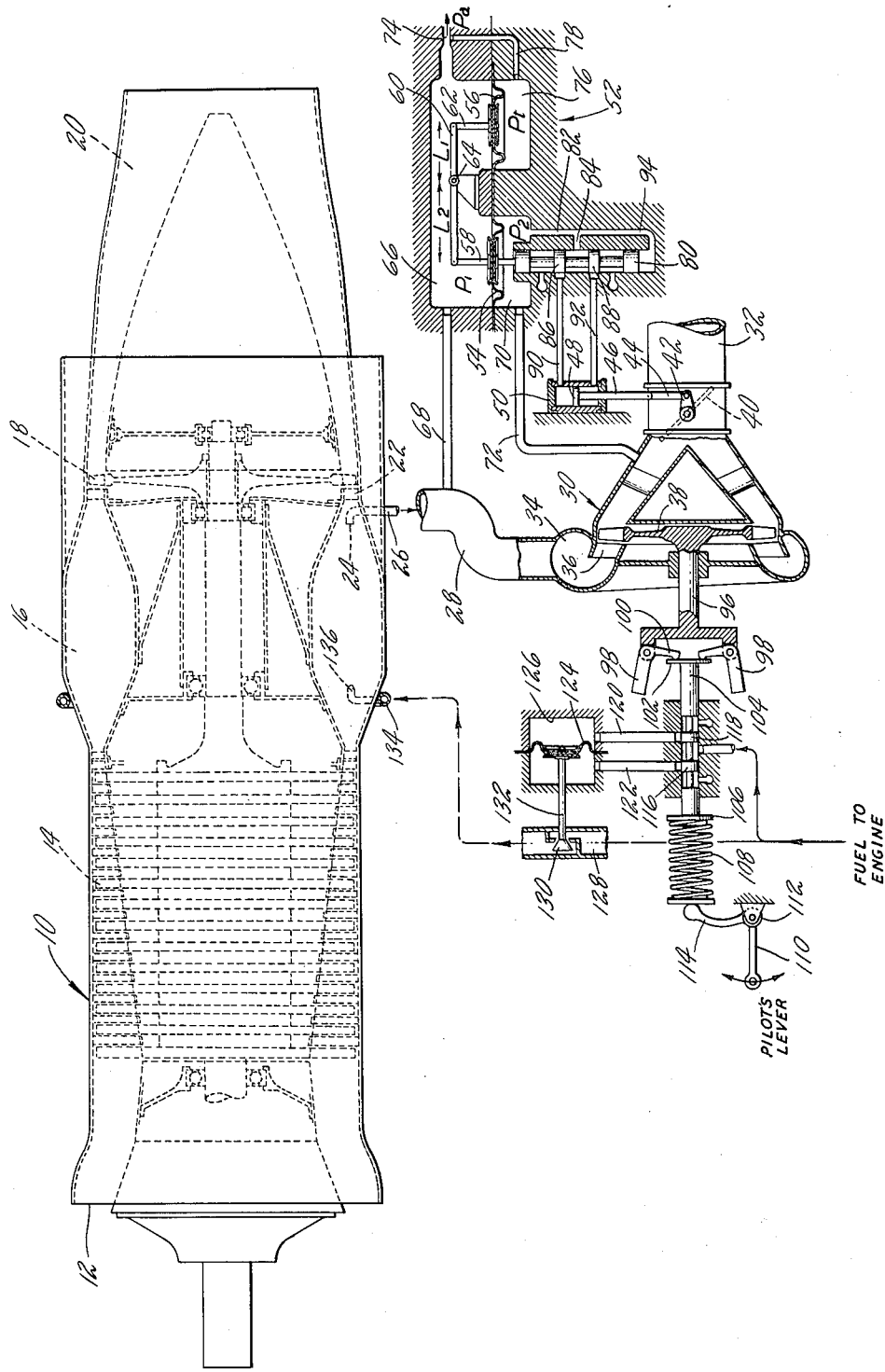
Inventor
Bruce N. Torell
By Russell M. Lipes, Jr.
Agent

United States Patent Office 2,731,794
Patented Jan. 24, 1956

2,731,794

EXHAUST GAS TEMPERATURE RESPONSIVE FUEL SYSTEM FOR GAS TURBINE POWER PLANT

Bruce N. Torell, Wethersfield, Conn., assignor to United Aircraft Corporation, East Hartford, Conn., a corporation of Delaware Application February 27, 1952, Serial No. 273,615

17 Claims. (Cl. 60—39.28)

This invention relates to fuel systems for combustion engines, more particularly to a fuel system for a combustion engine which regulates fuel flow to the engine as a function of the temperature of engine exhaust gases.

In the operation of gas turbine power plants fuel flow to the power plant usually is metered as a function of the temperature of the turbine gases, turbine inlet temperature being a parameter often used. An accurate and reliable measure of exhaust gas temperature thus is of utmost importance. Thermocouples customarily employed to measure this gas temperature are not reliable and are short-lived because of the pernicious effect of the elevated temperatures to which they are subjected.

It is known that when a constant pressure ratio is maintained across a turbine the velocity of the gases passing through the turbine is proportional to the square root of the temperature of the gases. By using blades which are substantially uncambered so that they can be loaded in either direction, a change in the temperature of the gases passing over the uncambered blades tends to increase the speed of the turbine rotor or decrease the speed of the rotor, dependent on whether the temperature (velocity) increases or decreases. The speed response of such a turbine can be utilized in various ways. In this invention it is used to regulate fuel flow to a power plant.

A fuel system for a combustion engine which uses the torque reaction on a small exhaust turbine, or turbo reactor, to regulate fuel flow to the engine is disclosed in copending application Serial No. 242,092, filed August 16, 1951, and assigned to applicant's assignee, now Patent No. 2,708,343. The blades of the turbine are substantially uncambered and both the speed of the turbine and the pressure ratio across it are maintained constant; the speed of the turbine being maintained constant by means of a motor-generator set and a synchronous motor driven by the turbine, and the pressure ratio being maintained constant by means of pressure regulators controlling throttle valves at the inlet and at the outlet of the turbine.

Due to variations of turbine speed as the square root of exhaust gas temperature, close control of the speed of the motor in the motor-generator set is very important. An error of two percent in speed will give a temperature error approximately double that value. It is dubious that the required speed regulation of the motor could be obtained from any electric motor operating from present day aircraft power supplies. Further, there may be objections to holding the pressure ratio across the exhaust turbine constant by holding both the inlet and outlet pressures constant because, assuming a desired pressure ratio of at least 1.2, the product of compressor and ram pressure ratios would have to be at least 6.8 at an altitude of 40,000 feet and 11.0 at 50,000 feet.

It is the purpose of this invention to improve the fuel system disclosed in the copending application referred to above by eliminating the motor-generator set and synchronous motor by eliminating the necessity for employing torque reaction, as well as eliminating the requirement for maintaining turbine inlet and exhaust pressures constant so as to give a constant pressure drop.

A feature of this invention is a device which accurately and reliably measures and controls the exhaust gas temperature of a combustion engine.

Another feature of the invention is a system which regulates fuel flow to a combustion engine as a function of exhaust gas temperature.

Another feature of the invention is a turbo reactor having its pressure ratio controlled so that a change in the temperature of exhaust gases passing over the turbo reactor will change the speed of the reactor rotor, which speed change is used to regulate fuel flow to a combustion engine.

Still another feature of the invention is a fuel system which provides rapid initiation of response to an off-temperature condition to an extent which is not achieved by ordinary temperature responsive devices due to a heat transfer lag or by speed responsive devices due to rotor inertia.

Other features and advantages will be apparent from the specification and claims and from the accompanying drawing which illustrates an embodiment of the invention.

In the drawing:

The single figure shows a schematic arrangement of the invention as applied to a gas turbine power plant.

Referring to the drawing in detail, 10 indicates generally a gas turbine power plant or engine having inlet 12, compressor 14, combustion chamber 16, turbine 18 and exhaust 20. Immediately upstream of turbine 18 there is provided an annular row of nozzle guide vanes 22. One or more bleeds 24 is located in the nozzle guide vane area so that a portion of the exhaust gases passing through the turbine may be bled from their normal path.

The bled or diverted gases pass through conduit 26 and conduit 28 and then through a turbo reactor shown generally at 30 from which they are discharged through outlet 32. The turbo reactor is comprised of inlet 34, guide vanes 36 and bladed rotor 38. Throttle valve 40 is provided in outlet 32 for regulating the outlet, or discharge, pressure of the turbo reactor. The throttle valve is connected by arm 42 and links 44 and 46 to piston 48 within cylinder 50.

A pressure ratio regulator is indicated generally at 52 and comprises two diaphragms 54 and 56 of equal area which are connected together by links 58, 60 and 62, link 60 being pivoted at 64 so that movement of diaphragm 54 and link 58 in one direction will cause movement of diaphragm 56 and link 62 in the opposite direction.

Diaphragm 54 is subjected on opposite sides to the inlet and the outlet pressures of the turbo reactor. Chamber 66 on the top side of the diaphragm is vented to the inlet of the reactor through conduit 68 which is connected to conduit 28. Chamber 70 on the lower side of diaphragm 54 is vented to the outlet of the reactor by means of conduit 72. The top side of diaphragm 56 also is subject to turbo reactor inlet pressure, chamber 66 being common to both diaphragms 54 and 56. Chamber 66 is vented to ambient pressure through nozzle 74, chamber 76 on the lower side of diaphragm 56 being connected to the throat of the nozzle by means of passage 78.

Servo piston 80 is connected to diaphragm 54 on the side opposite link 58 and moves whenever the diaphragm moves. This piston controls the admission of a motivating force, in this case turbo reactor discharge pressure, to opposite sides of piston 48 for adjusting the position of throttle valve 40. Passage 82 connects chamber 70 and port 84 which admits pressure to the central portion of servo piston 80, between lands 86 and 88. When diaphragm 54 and servo piston 80 move in an upward direction, land 86 uncovers the entrance to passage 90, admitting reactor discharge pressure to the top side of piston 48. The pressure forces piston 48 downward and closes throttle valve 40. When diaphragm 54 moves in a downward direction, reactor discharge pressure is admitted through passage 92 to the lower side of piston 48, the pressure forcing the piston upward and opening throttle valve 40. Suitable vents are provided for venting the side of piston 48 opposite to the side where pressure is applied. A passage 94 admits reactor discharge pressure to the lower side of servo piston 80 so that the piston is in balance.

Rotor 38 is connected to shaft 96 having governor flyweights 98 mounted thereon. An inwardly extending leg 100 on each flyweight contacts shoulder 102 on servo piston 104 so that movement of flyweights 98 in response to the speed of rotor 38 is transmitted to the servo piston. Shoulder 106 is provided on the opposite end of the servo piston as a thrust face for speeder spring 108. Pilot's lever 110 turning about pivot 112 and having arm 114 adjusts the tension on spring 108 to establish a temperature datum to which the device will regulate.

Servo piston 104 has lands 116 and 118 which control the admission of pressure through passages 120 and 122 to opposite sides of diaphragm 124 in cylinder 126. In this case the pressure is fuel being admitted to power plant 10 through conduit 128 from a source not shown. Valve 130 in conduit 128 meters fuel flow to the power plant and is connected by link 132 to diaphragm 124. Fuel in conduit 128 is supplied to ring 134 surrounding power plant 10 from which it is distributed to various nozzles within combustion chamber 16, one of the nozzles being shown at 136.

Designating turbo reactor inlet pressure as $P_1$, turbo reactor outlet pressure as $P_2$ and nozzle throat pressure as $P_t$, the relationship of arms $L_1$ and $L_2$ for maintaining a constant pressure ratio $P_1/P_2$ can be derived. It is known that the ratio of $P_1$ to ambient pressure, $P_a$, for the majority of engine operating conditions will be equal to or greater than the sonic ratio i. e. $P_1/P_a \geq 1.89$. It also is known that as $P_1$ increases, $P_t$ will remain equal to $P_a$ until $P_1/P_a > 1.89$. For any further increase of $P_1/P_a$, $P_1/P_t$ remains constant at a value of 1.89. Therefore $P_t = P_1/1.89$.

For the pressure ratio regulator 52 to be in balance:

$$L_1(P_1A - P_tA) = L_2(P_1A - P_2A)$$

where A is the area of diaphragms 54 and 56, which areas are equal. Substituting for $P_t$ and dividing by A:

$$L_1(P_1 - P_1/1.89) = L_2(P_1 - P_2)$$
$$.47L_1P_1 = L_2P_1 - L_2P_2$$
$$.47L_1(P_1/P_2) = L_2(P_1/P_2) - L_2$$
$$P_1/P_2(L_2 - .47L_1) = L_2$$
$$P_1/P_2 = L_2/(L_2 - .47L_1)$$

*Theory of operation*

Control of the exhaust gas temperature of a gas turbine power plant is accomplished by regulating fuel flow to the power plant, there also being in the case of a pure jet a relation between temperature and power plant speed which relation is a function of fuel flow. In this invention the operator adjusts lever 110 to establish the temperature datum, the lever being moved in a clockwise direction to increase temperature and in a counterclockwise direction to decrease temperature.

Assuming that it is desired to increase exhaust gas temperature, clockwise movement of lever 110 and arm 114 compresses spring 108 and forces servo piston 104 to the right, admitting fuel to the right hand side of diaphragm 124 the pressure of which tends to open valve 130 and increase fuel flow to the power plant. The increase in fuel flow in turn increases the temperature of the exhaust gases. Since pressure ratio regulator 52 maintains a constant pressure ratio across turbo reactor 30, an increase in the temperature of the exhaust gases passing over the uncambered blades of rotor 38 tends to increase the speed of the rotor. The increased speed displaces flyweights 98 outward and legs 100 force servo piston 104 to the left to return it to a neutral position, cutting off pressure to chamber 126 and maintaining valve 130 in a position which meters the necessary fuel flow to give the desired temperature.

When the pilot's lever 110 is moved in a counterclockwise direction to decrease exhaust gas temperature, servo piston 104 is displaced to the left as the tension of spring 108 is decreased, admitting fuel pressure to the left hand side of diaphragm 124 which pressure tends to close valve 130 and reduce fuel flow to the power plant. The temperature of the exhaust gases decreases as a result of the reduced fuel flow and, in turn, the speed of rotor 38 decreases. Governor flyweights 98 reflect the reduction in rotor speed and permit servo piston 104 to be moved to the right to a neutral position where the system is in equilibrium.

In the same manner a variation of the exhaust gas temperature from the established temperature will result in the change in the speed of the rotor 38. Any speed change will be reflected by movement of flyweights 98 and servo piston 104 will be displaced in accordance with the change to admit fuel pressure to one side or the other of diaphragm 124. Main fuel valve 130 will be opened or closed upon movement of diaphragm 124 so as to increase or decrease the flow of fuel to the power plant and restore the established temperature.

It is to be understood that the invention is not limited to the specific embodiment herein illustrated and described but may be used in other ways without departure from its spirit as defined by the following claims.

I claim:

1. A fuel system for a combustion engine in which fuel flow to the engine is metered as a function of the temperature of engine exhaust gases, said system including fuel metering means, rotor means driven by said exhaust gases, means regulating the flow of said exhaust gases through said rotor and maintaining a constant pressure ratio across said rotor, and rotor speed responsive means actuating said fuel metering means.

2. A fuel system for a combustion engine in which fuel flow to the engine is metered as a function of the temperature of engine exhaust gases, said system including fuel metering means, bladed rotor means driven by said exhaust gases, the blades being substantially uncambered, means regulating the flow of said exhaust gases over said blades and maintaining a constant pressure ratio across said rotor, and rotor speed responsive means actuating said fuel metering means.

3. A fuel system for a combustion engine, the system including a fuel supply, a conduit between the engine and the fuel supply, a turbo reactor having a bladed rotor therein driven by gases from the engine, the rotor blades being substantially uncambered, means responsive to gas pressure on either side of said reactor for regulating the flow of gases through said reactor and for maintaining a constant pressure ratio across the rotor, and means responsive to the speed imposed upon the rotor by the gases passing through the turbo reactor for regulating fuel flow through the conduit to the engine as a function of the temperature of said gases.

4. A fuel system for a combustion engine, the system including a fuel supply, a conduit between the engine and the fuel supply, a turbo reactor having a bladed rotor therein driven by gases from the engine, the rotor blades being substantially uncambered, pressure responsive means for regulating the flow of gases through said reactor and for maintaining a constant pressure ratio across the rotor, and means responsive to the speed imposed upon the rotor by the gases passing through the turbo reactor for regulating fuel flow through the conduit to the engine as a function of the temperature of said gases.

5. A fuel system for a combustion engine, the system including a turbo reactor having a bladed rotor therein driven by gases from the engine, means responsive to gas pressure on either side of said reactor for regulating the flow of gases through said reactor and for maintaining a constant pressure ratio across the rotor, speed responsive means connected to and responsive to the speed of the rotor, fuel flow regulating means controlled by the speed responsive means, and means for varying the effect of the speed responsive means on the fuel flow regulating means.

6. A fuel system for a combustion engine, the system including a turbo reactor having a bladed rotor therein driven by gases from the engine, the rotor blades being uncambered, means responsive to gas pressure on either side of said reactor for regulating the flow of gases through said reactor and for maintaining a constant pressure ratio across the rotor, a flyweight governor connected to the rotor and adapted to be responsive to the speed of the rotor, fuel flow regulating means controlled by the governor flyweight, and means actuated by the engine operator for varying the effect of the speed responsive means on the fuel flow regulating means.

7. A fuel system for a combustion engine, the system including a turbo reactor having a bladed rotor therein driven by gases from the engine, the rotor blades being uncambered, means responsive to gas pressure on either side of said reactor for regulating the flow of gases through said reactor and for maintaining a constant pressure ratio across the rotor, a flyweight governor connected to the rotor and adapted to be responsive to the speed of the rotor, servo motor means controlled by the governor flyweights, a valve for metering fuel flow to the engine, the valve being controlled by the servo motor means, and means for varying the effect of the governor flyweights on the servo motor means.

8. A fuel system for a combustion engine including a fuel supply, a conduit through which fuel from the supply is delivered to the engine, means for varying the quantity of fuel delivered to the engine, a turbo reactor having a bladed rotor therein driven by engine gases, means for regulating the flow of gases through the turbo reactor, means for adjusting the gas flow regulating means to maintain a constant pressure ratio across the turbo reactor rotor, means connected to the rotor and adapted to be responsive to the speed of the rotor, means controlled by the speed responsive means for adjusting the fuel quantity varying means, and means for altering the effect of the speed responsive means on the fuel quantity varying means.

9. A fuel system for a combustion engine including a fuel supply, a conduit through which fuel from the supply is delivered to the engine, means for varying the quantity of fuel delivered to the engine, a turbo reactor having a bladed rotor therein driven by engine gases, the blades on the rotor being substantially uncambered, means for regulating the flow of gases through the turbo reactor, means for adjusting the gas flow regulating means to maintain a constant pressure ratio across the turbo reactor rotor, means connected to the rotor and adapted to be responsive to the speed of the rotor, means controlled by the speed responsive means for adjusting the fuel quantity varying means, and means for altering the effect of the speed responsive means on the fuel quantity varying means.

10. A fuel system for a combustion engine including a fuel supply, a conduit through which fuel from the supply is delivered to the engine, a valve in the conduit for metering fuel flow to the engine, a turbo reactor having an inlet and an outlet and a bladed rotor driven by engine exhaust gases, the blades on the rotor being uncambered, a throttle for regulating flow of exhaust gases through the turbo reactor, turbo reactor inlet and outlet pressure responsive means for adjusting the position of the throttle, the pressure responsive means maintaining a constant pressure ratio across the turbo reactor rotor, means connected to the rotor and adapted to be responsive to the speed of the rotor, means controlled by the speed responsive means for adjusting the fuel flow metering valve, means opposing the effect of the speed responsive means on the valve adjusting means, and means for varying the effect of the opposing means.

11. A fuel system for a combustion engine including a fuel supply, a conduit through which fuel from the supply is delivered to the engine, a valve in the conduit for metering fuel flow to the engine, a turbo reactor having an inlet and an outlet and a bladed rotor driven by engine gases, the blades on the rotor being substantially uncambered, a throttle mounted within the turbo reactor outlet for regulating the flow of exhaust gases through the turbo reactor, turbo reactor inlet and outlet pressure responsive means for adjusting the position of the throttle, the pressure responsive means maintaining a constant pressure ratio across the turbo reactor rotor, governor flyweights connected to the rotor and adapted to be responsive to the speed of the rotor, means controlled by the governor flyweights for adjusting the fuel flow metering valve, means opposing the effect of the governor flyweights on the valve adjusting means, and means for varying the effect of the opposing means.

12. A fuel system for a combustion engine including a fuel supply, a conduit through which fuel from the supply is delivered to the engine, a valve in the conduit for metering fuel flow to the engine, a turbo reactor having an inlet and an outlet and a bladed rotor driven by engine exhaust gases, the blades on the rotor being substantially uncambered, a throttle mounted within the turbo reactor outlet for regulating the flow of exhaust gases through the reactor, turbo reactor inlet and outlet pressure responsive means for adjusting the position of the throttle, the pressure responsive means maintaining a constant pressure ratio across the turbo reactor rotor, governor flyweights connected to the rotor and adapted to be responsive to the speed of the rotor, means controlled by the governor flyweights for adjusting the fuel flow metering valve, a speeder spring opposing the effect of the governor flyweights on the valve adjusting means, and means for varying speeder spring tension.

13. For a gas turbine power plant comprising essentially a compressor section, a combustion section, and a turbine section, and having a turbine therein driven by exhaust gases, a device for regulating fuel flow to the power plant including a fuel supply, a conduit between the power plant and the fuel supply, a turbo reactor having a bladed rotor therein driven by gases from the power plant, means responsive to gas pressure on either side of said reactor for regulating the flow of gases through said reactor and for maintaining a constant pressure ratio across the rotor, and means responsive to the speed imposed upon the rotor by the gases passing through the turbo reactor for regulating fuel flow through the conduit to the power plant as a function of the temperature of said gases.

14. For a gas turbine power plant comprising essentially a compressor section, a combustion section, and a turbine section, and having a turbine therein driven by exhaust gases, a device for regulating fuel flow to the power plant including a turbo reactor having a bladed rotor therein, the rotor blades being substantially uncambered, means for bleeding exhaust gases from their normal path through the power plant, a conduit connecting the bleed means and the turbo reactor whereby the reactor rotor is driven by power plant exhaust gases, means responsive to gas pressure on either side of said reactor for regulating the flow of gases through said reactor and for maintaining a constant pressure ratio across the turbo reactor, reactor rotor speed responsive means, a valve for regulating fuel flow to the power plant, means responsive to the speed responsive means for controlling the valve, and means for varying the effect of the speed responsive means on the fuel valve.

15. For a gas turbine power plant comprising essentially a compressor section, a combustion section, and a turbine section, and having a turbine therein driven by exhaust gases, a device for regulating fuel flow to the power plant including a fuel supply, a conduit through which fuel from the supply is delivered to the power plant, means for varying the quantity of fuel delivered to the power plant, a turbo reactor having an inlet and an outlet and a bladed rotor therein, the rotor blades being substantially uncambered, means for bleeding exhaust gases from their normal path through the power plant, a conduit connecting the bleed means and the turbo reactor whereby the reactor rotor is driven by exhaust gases from the power plant, means for regulating the flow of exhaust gases through the turbo reactor, means for adjusting the gas flow regulating means to maintain a constant pressure ratio across the turbo reactor rotor, rotor speed responsive means, means controlled by the speed responsive means for adjusting the fuel quantity varying means, and means for altering the effect of the speed responsive means on the fuel quantity varying means.

16. For a gas turbine power plant comprising essentially a compressor section, a combustion section, and a turbine section, and having a turbine therein driven by exhaust gases, a device for regulating fuel flow to the power plant including a fuel supply, a conduit through which fuel from the supply is delivered to the power plant, a valve in the conduit for metering fuel flow to the power plant, a turbo reactor having an inlet and an outlet and a bladed rotor therein, the blades on the rotor being substantially uncambered, means for bleeding exhaust gases from their normal path through the power plant, a conduit connecting the bleed means and the turbo reactor whereby the reactor rotor is driven by exhaust gases from the power plant, a throttle valve mounted within the turbo reactor outlet for regulating the flow of exhaust gases through the reactor, turbo reactor inlet and outlet pressure responsive means for adjusting the position of the throttle valve, the pressure responsive means maintaining a constant pressure ratio across the turbo reactor rotor, governor flyweights connected to the rotor and adapted to be responsive to the speed of the rotor, means controlled by the governor flyweights for adjusting the fuel flow metering valve, a speeder spring opposing the effect of the governor flyweights on the fuel valve adjusting means, and means for varying speeder spring tension.

17. A fuel system for a combustion engine in which fuel flow to the engine is metered as a function of the temperature of engine exhaust gases, said system including fuel metering means, rotor means driven by said exhaust gases, throttle means regulating the flow of said exhaust gases through said rotor, pressure responsive means maintaining a constant pressure ratio across said rotor, and rotor speed responsive means actuating said fuel metering means.

References Cited in the file of this patent

UNITED STATES PATENTS

| | | |
|---|---|---|
| 2,545,856 | Orr, Jr. | Mar. 20, 1951 |
| 2,581,275 | Mock | Jan. 1, 1952 |